United States Patent Office

3,277,156
Patented Oct. 4, 1966

3,277,156
PROCESS FOR PRODUCING γ-METHYL
GLUTAMATE HYDROCHLORIDE
Yoshio Ishizuka and Ikuzo Tanaka, Tokyo, and Fumiki Takabayashi, Kawasaki-shi, Kanagawa-ken, Japan, assignors to Teikoku Jinzo Kenshi Kabushiki Kaisha, Osaka, Japan, a corporation of Japan
No Drawing. Filed Dec. 3, 1962, Ser. No. 241,528
Claims priority, application Japan, Dec. 2, 1961, 36/43,302
4 Claims. (Cl. 260—482)

This invention relates to a process for producing γ-methyl glutamate hydrochloride wherein monoesterifying hydrochloride of optically active l- or d-glutamic acid or optically inactive racemic glutamic acid (hereinafter to be referred to merely as glutamic acid) with methanol thereby producing γ-methyl glutamate hydrochloride, characterized by dissolving hydrochloride of glutamic acid in said methanol and using a strongly acidic ion exchange resin as a catalyst.

The object of this invention is to produce γ-methyl glutamate of high purity from which produced are the material of a high molecular synthetic compound usable as medicine, resin or fiber industrially easily and at high yield.

Processes for producing γ-methyl glutamate from glutamic acid and methanol in the presence of hydrogen chloride as a catalyst have heretofore been known, of which representative processes can be divided into the following two types. Namely, one is a process to produce γ-methyl glutamate hydrochloride which comprises adding glutamic acid to absolute methanol having absorbed therein hydrogen chloride in the amount of more than 2.5 mols per mol of glutamic acid, dissolving the former in the latter at room temperature and concentrating the solution under reduced pressure at a temperature below 40° C. (J. P. Greenstein and M. Winitz, "Chemistry of the Amino Acids," vol. 2, (1961) p. 927.) And another is a process for producing γ-methyl glutamate hydrochloride which comprises suspending glutamic acid in absolute methanol, rapidly introducing hydrogen chloride thereinto, and as soon as glutamic acid dissolves concentrating the solution under reduced pressure at a temperature below 40° C. (Compiled by Shiro Akabori and Sanichiro Mizushima, "Chemistry of Protein," vol. 1, page 404.)

There may be following disadvantages upon manufacturing the object on commercial scale in accordance with those processes. Namely, (1) Absolute methanol must be used.

(2) A greatly excessive amount of hydrogen chloride must be used in the first process while it is very difficult to control the introducing amount of hydrogen chloride in the second process.

(3) Unless the reaction temperature and the reaction period are properly selected, the amount of dimethyl glutamate hydrochloride or of the unreacted hydrochloride of glutamic acid becomes larger and the purity and yield of the desired γ-methyl glutamate hydrochloride are usually varied and not fixed.

(4) Because hydrochloric acid is contained in larger amount in the methanol recovered after the reaction upon continuously recycling said methanol, the recovery and re-use of the methanol are very troublesome because the contained hydrochloric acid must be removed or the amount of the contained hydrogen chloride must be determined and adjusted to the desired concentration of hydrogen chloride before the re-use.

(5) Because the damage of the apparatus caused by the contained hydrochloric acid and the vapor of hydrogen chloride generated during the reaction or the recovery operation is great, especially acid-resisting material must be used for the apparatus.

As a result of studying for an improved process for producing γ-methyl glutamate which overcomes the various disadvantages arising in those prior processes, we have found that the methylesterification proceeds by using hydrogen chloride in the amount slightly excessive over equivalent mol of glutamic acid. As a result of further study, we have found that it is effective to use as a catalyst of the reaction a sulfonic acid-type cation exchange resin instead of hydrogen chloride in the amount excessive over the equivalent amount of glutamic acid by taking advantage of the fact that hydrochloride of glutamic acid is soluble in methanol.

It has been well known that a strongly acidic ion exchange resin is useful as a catalyst for the esterification of fatty acid. (C. L. Leversque and A. M. Craig, "Industrial and Engineering Chemistry," vol. 40, page 96, 1948.) With reference to α-amino acids, there is only an example of heating and refluxing hippuric acid ($C_6H_5CONH \cdot CH_2 \cdot COOH$) with Amberlite IR–120 (an ion exchange resin manufactured by Rohm & Haas Co.) in methanol and thereby obtaining the methyl ester thereof (P. J. Mili and W. R. C. Crimmin, "Biochimica et Biophysica Acta," vol. 23, page 432 (1957)).

In this case, as hippuric acid is an α-amino acid and soluble in methanol, it is considered to be possible to carry out the reaction in a homogeneous phase and the desired ester of α-amino acid is easily obtained.

Whereas, since glutamic acid and γ-methyl glutamate are insoluble in methanol, the use of an ion exchange resin as such in the mixture is undesirable because the reaction will be effected in a heterogeneous phase.

Hydrochloride of glutamic acid and γ-methyl glutamate are soluble in methanol. Accordingly, when hydrochloride of glutamic acid is dissolved in methanol and contacted with a strongly acidic ion exchange resin, the reaction will proceed smoothly as a homogeneous reaction system since γ-methyl glutamate is obtained as its hydrochloride.

In this case, the methanol to be used is not necessarily completely free from water.

Methanol on the market usually contains about 200 mg. of water per 100 cc. of pure methanol, but the methanol containing such an extent of water can be sufficiently used in this invention. However, in this invention, since water always yields upon forming of γ-methyl glutamate, it is undesirable to positively add water to methanol used.

Upon practicing this invention, it is necessary to properly decide the various reaction conditions such as the amount of an ion exchange resin, the amount of methanol, the reaction temperature, the reaction period etc. and thereby it is possible to obtain γ-methyl glutamate hydrochloride of high purity at high yield.

The amount used of an ion exchange resin to hydrochloride of glutamic acid may vary in accordance with the reaction temperature, but usually it is from 0.05 millimol equivalent/g. to 5.2 millimol equivalent/g. When the reaction temperature is higher, smaller amount can be employed, but when the reaction temperature is near room temperature, a larger amount will be desirable since it would be able to shorten the reaction period.

An ion exchange resin used in the process of this invention ordinarily means a sulfonic acid-type cation exchange resin. For instance, polystyrene resin having a three dimensional structure copolymerized with a small amount of divinyl benzene introduced with sulfone radical may be named. Among those on the market, Amberlite IR–120 of Rohm & Hass Co., Dowex 50 of Dow Chemical Co. and Permutit Q of Permutit Co. may be desirable.

The amount of methanol to be used in the present invention may be the amount which can dissolve hydrochloride of glutamic acid in the reaction system. Generally, 282–790 parts (by weight) of methanol per 100 parts of hydrochloride of glutamic acid may be preferable, but the amount may vary according to the reaction temperature, for instance, when the esterification is carried out at 40° C. about 440 parts of methanol are desired. This relation may also vary by whether the esterification is carried out by a batchwise system or a continuous system.

As to the reaction temperature, because the reaction proceeds slowly at room temperature, it is desirable to carry out the reaction at a temperature higher than the room temperature. Generally, it is desirable to carry out the reaction at a temperature of 30–65° C., preferably 40–65° C.

The reaction period is especially closely related to the reaction temperature, but at the aforesaid preferable reaction temperature, 10–60 minutes, preferably 10–30 minutes will be enough.

Those relations will be explained in more detail hereinafter as to the results of operating various experiments using 438 parts of methanol per 100 parts of hydrochloride of glutamic acid and 618 parts of methanol per 100 parts of hydrochloride of glutamic acid, 0.92 millimol equivalent of a resin per g. of hydrochloride of glutamic acid and 2.3 millimol equivalents of a resin per g. of hydrochloride of glutamic acid at the reaction temperature of 40° C. and 60° C. for the reaction period of 10 minutes and 30 minutes.

Under these conditions, the amount of methanol has nothing to do with the yield of γ-methyl glutamate hydrochloride, however, the amount of a resin, the reaction temperature and the reaction period remarkably affect the said yield. Namely, with reference to the amount of a resin, generally as the resin used has smaller whole exchange capacity, the yield of γ-methyl glutamate hyrdochloride is increased.

And there is a mutual relation between the reaction temperature and the reaction period. When the temperature is 40° C., the average yield of γ-methyl glutamate hydrochloride is 90.9% when the reaction period is 10 minutes and 0.92 millimol equivalent of a resin per g. of hydrochloride of glutamic acid is used, while it is 92.9% when 2.3 millimol equivalents of a resin per g. of hydrochloride of glutamic acid is used and the reaction period is 30 minutes, or there seems hardly any difference between the two. However, when the higher temperature is employed, that is, 60° C., the average yield is 89.7% when the reaction period is 10 minutes while it is decreased to 76.6% when the reaction temperature is 30 minutes, and on the contrary, the amount of γ-dimethyl glutamate increases from 5.1% to 17.8%.

Accordingly, in this invention it is especially important to select the following conditions in order to selectively manufacture γ-methyl glutamate.

(a) Making the amount of an ion exchange resin to hydrochloride of glutamic acid within the range from 0.05 millimol equivalent/g. to 5.2 millimol equivalents/g.

(b) Making the reaction temperature within the range of 30–65° C., preferably 40–65° C.

(c) Making the reaction period within the range of 10–60 minutes, preferably 10–30 minutes.

And even within the range of the conditions of above (a), (b) and (c), in order to inhibit the formation of undesirable dimethyl ester of glutamic acid, it is desirable to shorten the reaction period especially when the amount used of a resin is comparatively larger and the reaction temperature is comparatively higher and on the contrary to prolong the reaction period when the amount used of a resin is smaller and the reaction temperature is lower within the range of above (a), (b) and (c).

Generally, when the reaction period is too much prolonged, the amount of formed dimethyl glutamate hydrochloride is increased, on the other hand, when the reaction period is shortened, hydrochloride of glutamic acid is apt to remain unreacted. Accordingly, it is necessary to select the proper reaction period according to the reaction temperature and the amount used of a resin as mentioned above.

Upon operating this invention, glutamic acid used is not always in the form of hydrochloride thereof at the beginning of the reaction. For instance, glutamic acid may be suspended in methanol and HCl gas in an amount equivalent to said glutamic acid may be introduced thereinto, or the necessary amount of hydrogen chloride (HCl) may be previously absorbed to methanol and free glutamic acid in an amount equivalent to said HCl may be added thereto.

Accordingly, in this invention, the mixture obtained either by suspending glutamic acid in methanol and introducing dry hydrogen chloride gas in an amount equivalent to the said glutamic acid thereinto or having methanol absorb dry hydrogen chloride gas and adding equivalent of glutamic acid thereto, namely, the system in which glutamic acid and hydrogen chloride are present in equivalent (stoichiometric) amount in methanol is all regarded as the system of hydrochloride of glutamic acid in methanol, which is regarded same as dissolving hydrochloride of glutamic acid in methanol as described in the process of this invention and the reaction may be typically carried out as follows:

Namely, it may comprise dissolving or without dissolving a hydrochloride of glutamic acid in methanol, adding as catalyst a strongly acidic ion exchange resin thereto, heating and esterifying the mixture with or without stirring, after the completion of the reaction removing the ion exchange resin by filtration and isolating γ-methyl glutamate hydrochloride either by evaporating the methanol filtrate until it is dried under reduced pressure or by evaporating and drying the methanol filtrate by flash evaporator. In this case, the concentration temperature may be preferably below the boiling point of the concentrate.

Besides this, the esterification reaction may be carried out through a column filled with an ion exchange resin. In this case, it is desirable that hydrochloride of glutamic acid has previously been dissolved in methanol.

Upon isolating γ-methyl glutamate, it may be possible to achieve the end by either concentrating the aforesaid methanol filtrate or neutralizing the same by a suitable base without concentrating. In this case, because as the amount of methanol is larger, the yield of γ-methyl glutamate decreases considerably, it is better to concentrate until the amount of methanol becomes about 170 parts per 100 parts of γ-methyl glutamate and the base to be used may be preferably an organic base.

The advantages of the process of this invention as compared with the known prior processes for manufacturing γ-methyl glutamate are as follows, as an effect of using a solid ion exchange resin as the catalyst for the esterification.

(1) It does not necessitate the various operations of generation, introduction and determination of gaseous hydrogen chloride, accordingly the problems of selecting the materials for industrial equipment become simple.

(2) The control of the reaction is easy and the resins can be repeatedly used by regeneration.

(3) It is possible to obtain high-purity γ-methyl glutamate at higher yield.

In the prior processes of using hydrogen chloride as catalyst, namely, in both cases of having it absorbed in methanol previously and of blowing it, the purity only amounts to 93.3% at the highest, but according to the process of this invention one having the purity of 97.2% can be obtained.

(4) Hydrogen chloride is present only as hydrochloride of glutamic acid and after the reaction it is consumed as γ-methyl glutamate hydrochloride or a small amount of dimethyl glutamate hydrochloride and the recovered methanol does never contain free hydrogen chloride and methanol can be recovered and reused by merely subjecting it to dehydration operation.

Next, the process of this invention will be explained with reference to examples, but this invention is not necessarily restricted thereby. All parts in examples are by weight.

*Example 1*

100 parts of hydrochloride of l-glutamic acid were dissolved in 616 parts of aboslute methanol (water ratio: 16 mg./100 cc.), 21.7 parts of Amberlite IR–120 (manufactured by Rohm & Hass Co.) were added thereto as a strongly acidic ion exchange resin and the mixture was refluxed and reacted at 65° C. for 10 minutes with stirring, thereafter the reaction product was immediately cooled and filtered, the filtrate was concentrated under reduced pressure and methanol was distilled off and dried by evaporation.

The product had the following composition:

| | Percent |
|---|---|
| Hydrochloride of glutamic acid | 6.2 |
| γ-methyl glutamate hydrochloride | 92.2 |
| γ-dimethyl glutamate hydrochloride | 1.6 |

*Example 2*

100 parts of l-glutamic acid were suspended in 769 parts of absolute methanol, 24.8 parts (equivalent to glutamic acid) of dry hydrogen chloride gas were absorbed and dissolved, and 27 parts of Amberlite IR–120 were added thereto and the mixture was reacted at 40° C. for 30 minutes with stirring.

The product had the following composition:

| | Percent |
|---|---|
| γ-methyl l-glutamate hydrochloride | 96.8 |
| Hydrochloride of l-glutamic acid | 2.6 |
| Dimethyl l-glutamate hydrochloride | 0.6 |

*Example 3*

Having 544 parts of commercially sold methanol absorb 24.8 parts of dry hydrogen chloride gas, 199 parts of d-glutamic acid were added to said solution and dissolved by heating and stirring. 68 parts of Amberlite IR–120 were added thereto and the mixture was refluxed and reacted at 65° C. for 30 minutes.

The product had the following composition:

| | Percent |
|---|---|
| γ-methyl d-glutamate hydrochloride | 70.0 |
| Hydrochloride of d-glutamic acid | 4.01 |
| Dimethyl d-glutamate hydrochloride | 26.0 |

*Example 4*

From the top of a column filled with Amberlite IR–120 and kept at 40° C., a solution of 100 parts of hydrochloride of l-glutamic acid in 616 parts of methanol on the market was fed into the column. The solution was so controlled as to pass through the resin layer in 30 minutes and the effluent for the first time was removed.

The product had the following composition:

| | Percent |
|---|---|
| γ-methyl l-glutamate hydrochloride | 90.1 |
| Hydrochloride of l-glutamic acid | 6.5 |
| Dimethyl l-glutamate hydrochloride | 3.4 |

*Example 5*

100 parts of hydrochloride of l-glutamic acid were dissolved in 435 parts of absolute methanol, 54 parts of Amberlite IR–120 were added thereto and the mixture was refluxed and reacted at 65° C. for 10 minutes with stirring, thereafter the product was immediately cooled and filtered. The filtrate was added with 43 parts of dehydrated pyridine and neutralized and cooled. After standing for 24 hours, it was filtered and dried. The yield of γ-methyl l-glutamate was 32.6 parts (yield ratio: 37.0%) and the purity thereof was 97.0%.

*Example 6*

100 parts of hydrochloride of l-glutamic acid were dissolved in 616 parts of absolute methanol, 21.7 parts of Amberlite IR–120 were added thereto and the mixture was reacted at 30° C. for 1 hour with stirring.

The product had the following composition:

| | Percent |
|---|---|
| γ-methyl l-glutamate hydrochloride | 86.3 |
| Hydrochloride of l-glutamic acid | 12.7 |
| Dimethyl l-glutamate hydrochloride | 1.0 |

We claim:

1. A process for preparing γ-methyl glutamate hydrochloride which comprises reacting glutamic acid hydrochloride with methanol in the presence of a sulfonic acid cation exchange resin at a temperature in the range of from about 30° to about 65° C. for a time period of from about 10 to about 60 minutes, the amount of said cation exchange resin present being in the range of from about 0.05 to about 5.2 millimol equivalents per gram of said glutamic acid hydrochloride.

2. The process according to claim 1 wherein said temperature is in the range of from about 40° to about 65° C.

3. The process according to claim 1 wherein said time period is in the range of from about 10 to about 30 minutes.

4. The process according to claim 1 wherein said cation exchange resin is polystyrene resin having a three-dimensional structure and including interpolymerized divinyl benzene sulfonic acid units.

References Cited by the Examiner

UNITED STATES PATENTS 2,561,323   7/1951   Waller et al. _____ 260—482

OTHER REFERENCES

Mili et al., Biochimica et Biophysica Acta, vol. 23, p. 432.

Levesque, Industrial and Engineering Chemistry, vol. 40, pp. 96–99 (1948).

Greenstein, Chemistry of the Amino Acids, vol. 2, p. 927 (1961) (QP 801. A5 G7 C3).

LORRAINE A. WEINBERGER, *Primary Examiner.*

LEON ZITVER, D. P. CLARKE, S. B. WILLIAMS, *Assistant Examiners.*